(12) United States Patent
Diekmann et al.

(10) Patent No.: US 12,129,212 B2
(45) Date of Patent: *Oct. 29, 2024

(54) POLYAMIDE POWDER FOR SELECTIVE SINTERING METHODS

(71) Applicant: Evonik Operations GmbH, Essen (DE)

(72) Inventors: Wolfgang Diekmann, Waltrop (DE); Maik Grebe, Bochum (DE); Franz-Erich Baumann, Duelmen (DE); Sylvia Monsheimer, Haltern am See (DE); Beatrice Küting, Marl (DE)

(73) Assignee: Evonik Operations GmbH, Essen (DE)

( * ) Notice: Subject to any disclaimer, the term of this patent is extended or adjusted under 35 U.S.C. 154(b) by 165 days.

This patent is subject to a terminal disclaimer.

(21) Appl. No.: 17/399,281

(22) Filed: Aug. 11, 2021

(65) Prior Publication Data

US 2021/0371346 A1 Dec. 2, 2021

Related U.S. Application Data

(63) Continuation of application No. 15/720,433, filed on Sep. 29, 2017, now Pat. No. 11,117,837.

(30) Foreign Application Priority Data

Sep. 30, 2016 (DE) .......................... 102016219080.6

(51) Int. Cl.
```
C08G 69/28      (2006.01)
B29C 64/165     (2017.01)
B33Y 70/00      (2020.01)
C04B 35/634     (2006.01)
C08G 69/14      (2006.01)
C08J 3/14       (2006.01)
B29C 64/153     (2017.01)
B33Y 70/10      (2020.01)
```

(52) U.S. Cl.
CPC ...... *C04B 35/63468* (2013.01); *B29C 64/165* (2017.08); *B33Y 70/00* (2014.12); *C08G 69/14* (2013.01); *C08G 69/28* (2013.01); *C08J 3/14* (2013.01); *B29C 64/153* (2017.08); *B33Y 70/10* (2020.01); *C08J 2377/02* (2013.01); *C08J 2377/06* (2013.01)

(58) Field of Classification Search
CPC . C08J 3/12; C08J 2377/02; C08J 3/14; C08G 69/26; C08G 69/28; C08L 77/06; C08L 77/02

See application file for complete search history.

(56) References Cited

U.S. PATENT DOCUMENTS

| | | | |
|---|---|---|---|
| 5,932,687 A | 8/1999 | Baumann et al. | |
| 6,243,616 B1 | 6/2001 | Droscher et al. | |
| 6,245,281 B1 | 6/2001 | Scholten et al. | |
| 7,135,525 B2 | 11/2006 | Petter et al. | |
| 7,148,286 B2 | 12/2006 | Baumann et al. | |
| 7,211,615 B2 | 5/2007 | Baumann et al. | |
| 7,317,044 B2 | 1/2008 | Monsheimer et al. | |
| 7,491,792 B2 | 2/2009 | Monsheimer et al. | |
| 7,708,929 B2 | 5/2010 | Monsheimer et al. | |
| 7,786,222 B2 | 8/2010 | Schmid et al. | |
| 7,795,339 B2 | 9/2010 | Monsheimer et al. | |
| 7,887,740 B2 | 2/2011 | Simon et al. | |
| 7,906,063 B2 | 3/2011 | Monsheimer et al. | |
| 7,988,906 B2 | 8/2011 | Monsheimer et al. | |
| 8,066,933 B2 | 11/2011 | Monsheimer et al. | |
| 8,119,715 B2 | 2/2012 | Monsheimer et al. | |
| 8,173,258 B2 | 5/2012 | Monsheimer et al. | |
| 8,232,333 B2 | 7/2012 | Haeger et al. | |
| 8,449,809 B2 | 5/2013 | Monsheimer et al. | |
| 8,591,797 B2 | 11/2013 | Monsheimer et al. | |
| 8,834,777 B2 | 9/2014 | Simon et al. | |
| 8,840,829 B2 | 9/2014 | Monsheimer et al. | |
| 8,865,053 B2 | 10/2014 | Monsheimer et al. | |
| 9,114,567 B2 | 8/2015 | Monsheimer et al. | |
| 9,144,941 B2 | 9/2015 | Grebe et al. | |
| 9,162,392 B2 | 10/2015 | Grebe et al. | |
| 9,238,310 B2 | 1/2016 | Grebe et al. | |
| 9,272,446 B2 | 3/2016 | Grebe et al. | |
| 9,382,420 B2 | 7/2016 | Diekmann et al. | |
| 9,428,610 B2 | 8/2016 | Diekmann et al. | |
| 9,643,359 B2 | 5/2017 | Baumann et al. | |
| 10,005,885 B2 | 6/2018 | Monsheimer et al. | |

(Continued)

FOREIGN PATENT DOCUMENTS

| | | |
|---|---|---|
| CN | 1817942 | 8/2006 |
| DE | 10330590 | 4/2004 |

(Continued)

OTHER PUBLICATIONS

Agrawal (Surface Tension of Polymers, Presentation, MIT, Jun. 29, 2005).
U.S. Appl. No. 09/025,127, filed Feb. 17, 1998, U.S. Pat. No. 5,932,687, Baumann et al..
U.S. Appl. No. 09/107,412, filed Jun. 30, 1998, U.S. Pat. No. 6,243,616, Droscher et al.
U.S. Appl. No. 10/665,472, filed Sep. 22, 2003, 2004/0137228, Monsheimer et al.
U.S. Appl. No. 11/332,270, filed Jan. 17, 2006, 2006/0244169, Monsheimer et al.

(Continued)

*Primary Examiner* — Gregory Listvoyb

(74) *Attorney, Agent, or Firm* — Grüneberg and Myers PLLC

(57) ABSTRACT

A polyamide powder for selective absorbing sintering, SAS, or selective inhibition sintering, SIS. The polyamide powder has a solution viscosity to ISO 307 of 1.8 to 2 and a rise in the solution viscosity of 0% to 25% when it is subjected to a temperature 20° C. below its melting temperature under air for 20 hours.

20 Claims, No Drawings

(56) References Cited

U.S. PATENT DOCUMENTS

| | | |
|---|---|---|
| 10,118,222 B2 | 11/2018 | Monsheimer et al. |
| 10,406,745 B2 | 9/2019 | Baumann et al. |
| 10,479,733 B2 | 11/2019 | Diekmann et al. |
| 10,596,728 B2 | 3/2020 | Diekmann et al. |
| 10,632,730 B2 | 4/2020 | Grebe et al. |
| 10,787,559 B2 | 9/2020 | Monsheimer et al. |
| 10,968,314 B2 | 4/2021 | Diekmann et al. |
| 11,117,837 B2 * | 9/2021 | Diekmann ............ B29C 64/165 |
| 2004/0102539 A1 | 5/2004 | Monsheimer et al. |
| 2004/0106691 A1 | 6/2004 | Monsheimer et al. |
| 2004/0137228 A1 | 7/2004 | Monsheimer et al. |
| 2004/0138363 A1 | 7/2004 | Baumann et al. |
| 2004/0180980 A1 | 9/2004 | Petter et al. |
| 2004/0204531 A1 | 10/2004 | Baumann et al. |
| 2004/0232583 A1 | 11/2004 | Monsheimer et al. |
| 2005/0027047 A1 | 2/2005 | Monsheimer et al. |
| 2005/0027050 A1 | 2/2005 | Monsheimer et al. |
| 2006/0071359 A1 | 4/2006 | Monsheimer et al. |
| 2006/0134419 A1 | 6/2006 | Monsheimer et al. |
| 2006/0135670 A1 | 6/2006 | Richter et al. |
| 2006/0189784 A1 | 8/2006 | Monsheimer et al. |
| 2006/0202395 A1 | 9/2006 | Monsheimer et al. |
| 2006/0223928 A1 | 10/2006 | Monsheimer et al. |
| 2006/0244169 A1 | 11/2006 | Monsheimer et al. |
| 2007/0013108 A1 | 1/2007 | Monsheimer et al. |
| 2007/0126159 A1 | 6/2007 | Simon et al. |
| 2007/0182070 A1 | 8/2007 | Monsheimer et al. |
| 2007/0183918 A1 | 8/2007 | Monsheimer et al. |
| 2007/0197692 A1 | 8/2007 | Monsheimer et al. |
| 2007/0232753 A1 | 10/2007 | Monsheimer et al. |
| 2007/0238056 A1 | 10/2007 | Baumann et al. |
| 2008/0116616 A1 | 5/2008 | Monsheimer et al. |
| 2008/0166496 A1 | 7/2008 | Monsheimer et al. |
| 2008/0249237 A1 | 10/2008 | Hager et al. |
| 2008/0258346 A1 | 10/2008 | Simon et al. |
| 2008/0300353 A1 | 12/2008 | Monsheimer et al. |
| 2009/0088508 A1 | 4/2009 | Monsheimer et al. |
| 2009/0236775 A1 * | 9/2009 | Monsheimer .......... B33Y 70/00 528/323 |
| 2010/0320649 A1 | 12/2010 | Niebling |
| 2010/0324190 A1 | 12/2010 | Monsheimer et al. |
| 2011/0118410 A1 | 5/2011 | Simon et al. |
| 2011/0130515 A1 | 6/2011 | Monsheimer et al. |
| 2011/0237756 A1 | 9/2011 | Monsheimer et al. |
| 2011/0252618 A1 | 10/2011 | Diekmann et al. |
| 2012/0041132 A1 | 2/2012 | Monsheimer et al. |
| 2012/0202012 A1 | 8/2012 | Grebe et al. |
| 2012/0264877 A1 | 10/2012 | Häger et al. |
| 2012/0315483 A1 | 12/2012 | Baumann et al. |
| 2013/0011660 A1 | 1/2013 | Diekmann et al. |
| 2013/0012643 A1 | 1/2013 | Monsheimer et al. |
| 2013/0101803 A1 | 4/2013 | Grebe et al. |
| 2013/0171416 A1 | 7/2013 | Diekmann et al. |
| 2013/0177766 A1 | 7/2013 | Grebe et al. |
| 2013/0177767 A1 | 7/2013 | Grebe et al. |
| 2013/0183493 A1 | 7/2013 | Grebe et al. |
| 2013/0183494 A1 | 7/2013 | Grebe et al. |
| 2013/0183529 A1 | 7/2013 | Diekmann et al. |
| 2013/0216836 A1 | 8/2013 | Grebe et al. |
| 2013/0274435 A1 | 10/2013 | Diekmann et al. |
| 2013/0316145 A1 | 11/2013 | Diekmann et al. |
| 2014/0079916 A1 | 3/2014 | Grebe et al. |
| 2014/0371364 A1 | 12/2014 | Monsheimer et al. |
| 2015/0251247 A1 | 9/2015 | Monsheimer et al. |
| 2016/0167304 A1 | 6/2016 | Diekmann et al. |
| 2017/0165912 A1 | 6/2017 | Diekmann et al. |
| 2017/0165913 A1 | 6/2017 | Diekmann et al. |
| 2017/0274591 A1 | 9/2017 | Grebe et al. |
| 2018/0036938 A1 | 2/2018 | Baumann et al. |

FOREIGN PATENT DOCUMENTS

| | | |
|---|---|---|
| EP | 0 911 142 | 4/1999 |
| EP | 1642923 | 4/2006 |
| ES | 2 245 014 | 12/2005 |
| JP | 2004-137465 | 5/2004 |
| JP | 2006-104470 | 4/2006 |
| JP | 2009-226952 | 10/2009 |
| WO | 2017/196361 | 11/2017 |
| WO | 2017/196364 | 11/2017 |

OTHER PUBLICATIONS

U.S. Appl. No. 10/637,637, filed Aug. 11, 2003, 2004/0106691, Monsheimer et al.
U.S. Appl. No. 12/131,425, filed Jun. 2, 2008, 2008/0300353, Monsheimer et al.
U.S. Appl. No. 10/901,204, filed Jul. 29, 2004, 2005/0027050, Monsheimer et al.
U.S. Appl. No. 10/565,779, filed Jan. 25, 2006, 2006/0223928, Monsheimer et al.
U.S. Appl. No. 13/024,629, filed Feb. 10, 2011, 2011/0130515, Monsheimer et al.
U.S. Appl. No. 11/293,360, filed Dec. 5, 2005, 2006/0134419, Monsheimer et al.
U.S. Appl. No. 13/494,082, filed Jun. 12, 2012, 2012/0264877, Häger et al.
U.S. Appl. No. 13/156,577, filed Jun. 9, 2011, 2011/0237756, Monsheimer et al.
U.S. Appl. No. 11/671,820, filed Feb. 6, 2007, 2007/0182070, Monsheimer et al.
U.S. Appl. No. 11/694,129, filed Mar. 30, 2007, 2007/0232753, Monsheimer et al.
U.S. Appl. No. 13/012,283, filed Jan. 24, 2011, 2011/0118410, Simon et al.
U.S. Appl. No. 12/528,456, filed Oct. 1, 2009, 2010/0320649, Niebling et al.
U.S. Appl. No. 13/086,860, filed Apr. 14, 2011, 2011/0252616, Diekmann et al.
U.S. Appl. No. 13/581,085, filed Aug. 24, 2012, 2012/0315483, Baumann et al.
U.S. Appl. No. 13/552,891, filed Jul. 19, 2012, 2013/0183494, Grebe et al.
U.S. Appl. No. 13/722,159, filed Dec. 20, 2012, 2013/0177766, Grebe et al.
U.S. Appl. No. 13/733,465, filed Jan. 3, 2013, 2013/0177767, Grebe et al.
U.S. Appl. No. 13/859,896, filed Apr. 10, 2013, 2013/0274435, Diekmann et al.
U.S. Appl. No. 13/889,568, filed May 8, 2013, 2013/0316145, Diekmann et al.
U.S. Appl. No. 15/051,757, filed Feb. 24, 2016, 2016/0167304, Diekmann et al.
U.S. Appl. No. 14/029,153, filed Sep. 17, 2013, 2014/0079916, Grebe et al.
Richter et al., U.S. Appl. No. 18/245,317, filed Mar. 14, 2023.
U.S. Appl. No. 18/245,317, filed Mar. 14, 2023, Richter et al.

* cited by examiner

POLYAMIDE POWDER FOR SELECTIVE SINTERING METHODS

CROSS-REFERENCE TO RELATED APPLICATIONS

The present application claims the benefit of German Patent Application No. 102016219080.6, filed Sep. 30, 2016, the contents of which are incorporate herein by reference in their entirety.

BACKGROUND OF THE INVENTION

Field of the Invention

The present invention relates to polyamide powders for use in selective absorbing sintering, SAS, or selective inhibition sintering, SIS, and to the use thereof. The invention further relates to shaped bodies and to the production thereof.

Description of the Related Art

Additive manufacturing methods, frequently also referred to as rapid prototyping, are used in order to be able to quickly and inexpensively manufacture three-dimensional objects. This manufacturing is effected directly on the basis of the in-computer data models from shapeless (liquids, powders or the like) or shape-neutral (in ribbon or wire form) material by means of chemical and/or physical processes. Polymer powders in particular, such as polyamide powder, are suitable as shapeless material.

Powder bed fusion methodology includes, among other techniques, direct metal laser sintering (DMLS), electron beam melting (EBM), selective heat sintering (SHS), selective laser melting (SLM), selective laser sintering (SLS), selective absorbing sintering (SAS) and selective inhibition sintering (SIS). The SAS method is described, for example, in US 2007/238056. US 2004/137228 A1 presents the SIS method.

The selectivity of the laser-free processes can be accomplished, for example, via absorbers (selective absorbing sintering, SAS) or inhibitors (selective inhibition sintering, SIS). In the SAS method, the absorption of the material in contact with the absorber is increased; by contrast, the inhibitor retards the melting. Absorber and inhibitor can be used together in one method. Suitable energy sources in SAS methods are those that are incorporated into the material only to a limited degree. In the SIS method, the energy source should be chosen such that the material is heated sufficiently rapidly.

Absorbers and inhibitors can be applied to the material in dissolved or dispersed form in a liquid, for example by means of inkjet methods in the form of inks. The liquid or absorber and inhibitor should merely be absorbed by the material printed and not flow away horizontally or vertically within the material.

As a result of the use of the polyamide powder in molding production, which typically takes place 10 to 20 K below the melting temperature, aging phenomena can occur. In this context, the amine and carboxylic acid end groups react with one another and cause extension of the polyamide chains. Reprocessing of the powder is no longer possible, and so the unprocessed powder has to be exchanged.

SUMMARY OF THE INVENTION

The problem addressed was thus that of providing a polyamide powder which can be used in SAS or SIS processes, wherein the unprocessed polyamide powder can be employed again. This can reduce costs and protect the environment. The moldings obtained, in spite of the use of polyamide powder from previous molding productions, should exhibit homogeneous properties. Moreover, the moldings that are obtained by SAS or SIS, compared to selective laser sintering SLS, should have distinctly improved mechanical properties such as elevated elongation at break.

Accordingly, polyamide powders for selective absorbing sintering, SAS, or selective inhibition sintering, SIS, have been found, which do not have the disadvantages of the prior art. The polyamides have a solution viscosity to ISO 307 of 1.8 to 2. In addition, the rise in the solution viscosity is 0% to 25%, preferably 5% to 15%, when the polyamide powder is subjected to a temperature 20° C. below its melting temperature under air for 20 h.

A temperature of 20° C. below the melting temperature under air for 20 h simulates conditions that exist in a construction space for production of moldings.

DETAILED DESCRIPTION OF THE INVENTION

The problem was solved by a polyamide powder having a relatively high initial viscosity and only a slight rise in the solution viscosity over the period of 20 h. As a result, it can be reused repeatedly.

Solution viscosity is determined in a double determination according to ISO 307 using the following parameters: Schott AVS Pro, solvent: acidic m-cresol, volumetric method, dissolution temperature 100° C., dissolution time 2 h, polymer concentration 5 g/l, measurement temperature 25° C.

To determine the rise in the solution viscosity, the powder is subjected to a temperature 20° C. below its melting temperature under air for 20 h. The solution viscosity of the respective powders is subsequently determined as specified above.

The melting temperature is determined by means of differential scanning calorimetry (DSC) to DIN 53765. The crucial parameter is the melting temperature in the first heating step. The heating and cooling rates are each 20 K/min. The measurements are effected by means of a DSC 7 from Perkin Elmer.

Preferably, the polyamide has either amine end groups in excess or carboxylic acid end groups in excess. The excess can be achieved by means of diamines or dicarboxylic acids, preferably dicarboxylic acids. Based on the mass of the polyamide powder, the excess of one end group over the other end group is 20 to 60 mmol/kg.

In a preferred embodiment of the invention, the polyamide powder has open mesopores, and the cumulative pore volume distribution of the mesopores, measured to DIN 66134, is at least 0.01 cm$^3$/g. The cumulative pore volume distribution is more preferably at least 0.025 cm$^3$/g and most preferably at least 0.035 cm$^3$/g. Further-preferred cumulative pore volume distributions are respectively at least 0.045 cm$^3$/g, 0.05 cm$^3$/g, 0.06 cm$^3$/g and 0.07 cm$^3$/g. Preferably, the cumulative pore volume distribution is not more than 0.15 cm$^3$/g and more preferably not more than 0.1 cm$^3$/g. In a further preferred embodiment of the invention, the cumulative pore volume distribution is 0.05 cm$^3$/g to 0.15 cm$^3$/g, more preferably 0.06 cm$^3$/g to 0.1 cm$^3$/g.

Through the open pores, absorber or inhibitor moves from the surface into the particle interior and can thus enable more homogeneous distribution of these substances. This results in more homogeneous melting. In addition, horizontal or vertical running of the liquid is prevented, since the liquid is absorbed in a relatively high amount by the particles—by contrast with superficial absorption.

The pores bring about, through capillary forces, absorption of absorber or inhibitor in the form of the liquid. The effect of the cumulative pore volume distribution of at least 0.01 cm$^3$/g is that absorber or inhibitor is absorbed very quickly; ultimately, during the SAS or SIS method, it is customary for temperatures to exceed 100° C., which leads to rapid evaporation of the liquid. In this case, absorbers or inhibitors should not run or merge into one another. If the cumulative pore volume distribution were to be below at least 0.01 cm$^3$/g, the liquid would evaporate before absorbers or inhibitors had penetrated into the particles. Absorbers would thus remain on the surface of the particles as in the prior art, and the inhibitor would achieve low inhibitor performance.

Open pores of the particles are connected to the surrounding medium, whereas closed pores are intrinsically closed off and do not allow any medium to penetrate. Fine pores having a diameter of 20 μm or less are subdivided by IUPAC into macropores (>50 nm), mesopores (2-50 nm) and micropores (<2 nm). A preferred polyamide powder has at least 30%, more preferably at least 50%, open mesopores, based in each case on the sum total of open macro- and mesopores of the polyamide powder having a pore diameter of 2 to 300 nm, measured to DIN 66134. The standard applies to mesoporous solids, but the range above 50 nm was likewise determined according to this standard.

Polyamides having micropores are less suitable, since they cannot absorb the liquid quickly enough and cannot absorb customary absorbers at all. Macropores can exhibit reduced capillary action and likewise do not lead to sufficiently rapid absorption of the liquid containing absorber or inhibitor into the particle interior.

The polyamide powder preferably absorbs 1,000 pl to 30,000 pl of liquid per gram of polyamide powder, preferably 3,000 pl to 25,000 pl, and more preferably 5,000 pl to 20,000 pl.

Suitable liquid is typically any compressible liquid which contains absorber or functions as inhibitor. The liquid in which the absorber or the inhibitor is dissolved or dispersed is preferably selected from the solvents water, monoalcohols having 1 to 4 carbon atoms, glycol, or mixtures thereof.

In one embodiment of the invention, the polyamide powder includes either absorbers or inhibitors. For this purpose, the polyamide powder has been contacted with the liquid described above. This can be effected, for example, by known printing methods.

The absorbers or inhibitors may be colorants. As used herein, "colorant" is the umbrella term for all coloring substances. They can be divided into dyes and pigments by their solubility in the surrounding medium according to DIN 55944:1990-04, Dyes are organic black or colored substances that are soluble in the surrounding medium. Pigments, by contrast, are colorants in the form of powders or platelets that, by contrast with dyes, are insoluble in the surrounding medium. The particle size is typically 30 to 200 nm (laser diffraction). The colorant is preferably a pigment. Preferably, the pigment is selected from the group consisting of organic and inorganic, color, effect, color and effect, magnetically shielding, electrically conductive, corrosion-inhibiting, fluorescent and phosphorescent pigments. Preference is given to using the color and/or effect pigments.

Suitable pigments are selected from chalk, ochre, umber, green earth, burnt sienna, graphite, titanium white (titanium dioxide), lead white, zinc white, lithopone, antimony white, carbon black, iron oxide black, manganese black, cobalt black, antimony black, lead chromate, lead oxide rod, zinc yellow, zinc green, cadmium red, cobalt blue, Prussian blue, ultramarine, manganese violet, cadmium yellow, Paris green, molybdate orange, molybdate red, chromium orange, chromium red, iron oxide red, chromium oxide green, strontium yellow, metal effect pigments, pearlescent pigments, luminous pigments comprising fluorescent and/or phosphorescent pigments, gamboge, bone charcoal, Kassel brown, indigo, chlorophyll, azo dyes, indigoids, dioxazine pigments, quinacridone pigments, phthalocyanine pigments, isoindolinone pigments, perylene pigments, perinone pigments, metal complex pigments, alkali blue pigments and diketopyrrolopyrrole.

In order to achieve better processability of the polyamide powder, it may be advantageous that additives are added. Additives of this kind may, for example, be free-flow aids. More preferably, the polyamide powder includes 0.05% to 5% by weight, preferably from 0.1% to 1% by weight, based on the total weight of the polyamide powder, of additives, Free-flow aids may, for example, be fumed silicas, stearates or other free-flow aids known from the literature, for example tricalcium phosphate, calcium silicates, $Al_2O_3$, MgO, $MgCO_3$ or ZnO. Fumed silica is supplied, for example, under the AEROSIL brand name (Evonik Industries AG).

As well as or instead of such free-flow aids, some of which are inorganic, or other additives, the polyamide powder may also include inorganic filling materials. The use of such filling materials has the advantage that these essentially retain their shape through the treatment in the bonding operation and hence reduce shrinkage of the shape body. Moreover, it is possible through the use of filling materials, for example, to alter the plastic and physical properties of the objects. Thus, through use of powder material including metal powder, both the transparency and color and the magnetic or electrical properties of the object can be adjusted. As fillers or filling materials, the powder material may include, for example, glass particles, ceramic particles or metal particles. Typical fillers are, for example, metal granules, aluminum powder, steel shot or glass beads. Particular preference is given to using powder materials including glass beads as filling materials. In a preferred embodiment, the powder material according to the invention includes from 1% to 70% by weight, preferably from 5% to 50% by weight, and most preferably from 10% to 40% by weight of filling materials, based on the total weight of the polyamide powder.

The surface energy of the liquid should be less than the surface energy of the polyamide powder.

In embodiments, the liquid contains the colorant preferably in a proportion of 0.1% to 10% by weight, more preferably 2.5% to 5% by weight, based on the total weight of the liquid. The pH of the liquid is typically adjusted to the range of 6 to 9.

Suitable liquids may be commercial inks which are supplied for inkjet printing.

Suitable polyamides for the polyamide powder may be customary and known polyamides. Polyamides include homopolyamides and copolyamides. Suitable polyamides or copolyamides are selected from nylon-6, -11, -12, -10,13, -10,12, -6,6, -4,6, -6,13, -10,6, -11/10,10, -12,12 and -12/10,12. A preferred polyamide is selected from nylon-11, -12, -10,13, -10,12, -11/10,10, -12,12 and -12/10,12, more preferably nylon-11 or -12, and most preferably nylon-12.

Typically, a polyamide powder which is used in sintering methods should have a minimum BET surface area. The prior art discloses that the value should be, for example, less than 7 m²/g. The polyamide powder according to the invention, by contrast, should preferably have a BET surface area, measured to DIN ISO 9277, of at least 7 m²/g, preferably in a range of from 7.5 m²/g to 30 m²/g. A particularly preferred embodiment includes polyamides having a BET surface area of at least 7 m²/g, preferably of 7.5 m²/g to 30 m²/g. Measurement is effected with the Micromeritics TriStar 3000 instrument, nitrogen gas adsorption, discontinuous volumetric method, 7 data points at relative pressures P/P0 from about 0.05 to about 0.20, dead volume calibration using He (99.996%), sample preparation 1 h at 23° C.+16 h at 80° C. in vacuo, specific surface area based on devolatilized specimen, evaluation by means of multipoint determination.

In a preferred embodiment, the polyamide powder has a cumulative pore volume distribution of at least 0.02 cm³/g and a BET surface area of at least 2.8 m²/g, preferably 0.04 cm³/g to 5.8 m²/g, more preferably 0.05 cm³/g to 10 m²/g and especially preferably of 0.07 cm³/g to 13 m²/g.

The weight-average particle diameter $d_{50}$ of the polyamide powder, measured by means of laser diffraction, should be preferably not more than 100 μm, preferably 10 μm to 80 μm (Malvern Mastersizer 3000; wet dispersion was effected in water, refractive index and blue light value fixed at 1.52; evaluation via Mie theory; dry measurement, 20-40 g of powder metered in by means of a Scirocco dry disperser; vibrating channel feed rate 70%, dispersion air pressure 3 bar; measurement time for the sample 5 seconds (5000 individual measurements)). Polymers having such diameters are also referred to as polymer powder.

It is advantageous when the polyamide powder with a particle diameter of less than 10.48 μm (ultrafine particles) is present in a small amount. The proportion of ultrafine particles should be less than 3% by weight, preferably less than 1.5% by weight and more preferably less than 0.75% by weight, based in each case on the total weight of polyamide powder. This reduces the evolution of dust and enables an improvement in processability. Ultrafine particles can be removed, for example, by means of sifting.

Preference is further given to polyamide powders having a bulk density, measured to DIN 53466, between 300 g/l and 600 g/l.

In addition, polyamides having a surface energy of not more than 35 mN/m, preferably from 25 mN/m to 32 mN/m, are preferred polyamides. The surface energy is determined by means of contact angle measurement by the capillary rise height method by use of the Washburn equation and the evaluation method according to Owens, Wendt, Rabel and Kaelble. Polyamide powders of this kind have very homogeneous flowability, which results in a high dimensional stability of the shaped bodies.

The polyamide powder and the composition thereof can be obtained by grinding the powder produced or by a precipitation process (re-precipitation). The polyamide powders obtained by the preferred precipitation process typically feature a higher cumulative pore volume distribution than polyamides which are obtained by grinding methods, for example. Polyamides which are not obtained by a precipitation process but by grinding methods in particular have a cumulative pore volume distribution of generally well below 0.01 cm³/g.

In the precipitation process, the polyamide is at least partly dissolved at elevated temperature and then precipitated by reducing the temperature. Suitable solvents for polyamides are, for example, alcohols such as ethanol. U.S. Pat. No. 5,932,687 mentions suitable process conditions, for example. To establish the desired property, it is advantageous to leave the suspension obtained at a temperature 2-4 K above the precipitation temperature for 10 min to 180 min after the precipitation.

The invention further provides a process for production of the aforementioned polyamide powder. In embodiments, the production process comprises polymerization and/or polycondensation of monomers to give a polyamide (step a) and powder production by grinding or re-precipitation (step b). In step a, either diamines are added as chain transfer agent to achieve an amine end group excess, or dicarboxylic acids are added to achieve a carboxylic acid end group excess. The diamines or dicarboxylic acids are preferably added in such a ratio that an excess of one of the end groups is 20 to 60 mmol/kg over the other end group (based on the mass of the polyamide powder).

Suitable monomers are, for example, monomers suitable for production of the polyamides nylon-6, -11, -12, -10,13, -10,12, -6,6, -4,6, -6,13, -10,6, -11/10,10, -12,12 and -12/10,12.

Suitable diamines and dicarboxylic acids for establishment of the excess of end groups may be the same as or different from the monomers of the polyamides. Examples include tetramethylenediamine, hexamethylenediamine, decanediamine, dodecanediamine, adipic acid, sebacic acid, dodecanoic acid, brassylic acid. It is preferable that the diamines or dicarboxylic acids have the same number of carbon atoms as the monomers of the polyamides.

In one embodiment of the invention, the polyamide can be obtained by co-precipitation. For this purpose, in step a, at least one polyamide of the AB type, prepared by polymerization of lactams having 4 to 14 carbon atoms in the monomer unit or by polycondensation of the corresponding ω-aminocarboxylic acids having 4 to 14 carbon atoms in the monomer unit and at least one polyamide of the AABB type, prepared by polycondensation of diamines and dicarboxylic acids each having 4 to 14 carbon atoms in the monomer units, is obtained. In this case, the powder is obtained in step b by co-precipitation of the at least one polyamide of the AB type and the at least one polyamide of the AABB type.

The invention further provides for the use of the polyamide powder according to the invention in SAS or SIS methods for production of shaped bodies. It is preferable here to contact the polyamide powder with the liquid.

In addition, shaped bodies which are obtained at least partly from polyamide powders according to the invention form a further part of the subject-matter of the invention. Furthermore, processes for producing shaped bodies by means of SAS or SIS methods, wherein the polyamide powder according to the invention is used, likewise form part of the subject-matter of the invention.

Having generally described this invention, a further understanding can be obtained by reference to certain specific examples which are provided herein for purposes of illustration only, and are not intended to be limiting unless otherwise specified.

EXAMPLE

A nylon-12 was produced. As well as laurolactam as monomer, dodecanoic acid was used in order to obtain an excess of dicarboxylic acid end groups. The powder was obtained by means of a precipitation process.

The melting temperature and the solution viscosity of the obtained powder were determined. Thereafter, the powder was subjected to a temperature 20° C. below its melting temperature under air for 20 hours, and the solution viscosity was determined constantly.

Melting temperature: 185° C.
Temperature for simulation of ageing: 165° C.

| Time/h | Solution viscosity |
|--------|-------------------|
| 0 | 1.88 |
| 1 | 1.99 |
| 2 | 2.02 |
| 4 | 2.05 |
| 8 | 2.08 |
| 20 | 2.07 |

Numerous modifications and variations on the present invention are possible in light of the above teachings. It is therefore to be understood that within the scope of the appended claims, the invention may be practiced otherwise than as specifically described herein.

The invention claimed is:

1. A polyamide powder for selective absorbing sintering, SAS, or selective inhibition sintering, SIS, wherein the polyamide has a solution viscosity to ISO 307 of 1.8 to 2 and a rise in the solution viscosity of 5% to 25%, when subjected to a temperature 20° C. below its melting temperature under air for 20 hours,
   an excess of carboxylic acid end groups over amine end groups of 20 to 60 mmol/kg,
   a surface energy of the polyamide, determined by a contact angle measurement by a capillary rise height method by use of the Washburn equation and the evaluation method according to Owens, Wendt, Rabel and Kaelble, is not more than 35 mN/m,
   the polyamide powder absorbs liquid in a volume of 1,000 pl/g to 30,000 pl/g, wherein the polyamide powder contains only a single type of polyamide, and
   wherein the single type of polyamide is an AB type or AABB type polyamide.

2. The polyamide powder according to claim 1, wherein the polyamide has a rise in solution viscosity of 5 to 15% when subjected to a temperature 20° C. below its melting temperature under air for 20 hours.

3. A polyamide powder for selective absorbing sintering, SAS, or selective inhibition sintering, SIS,
   wherein the polyamide has a solution viscosity to ISO 307 of 1.8 to 2 and a rise in the solution viscosity of 5% to 25%, when subjected to a temperature 20° C. below its melting temperature under air for 20 hours,
   an excess of carboxylic acid end groups over amine end groups of 20 to 60 mmol/kg,
   a surface energy of the polyamide, determined by a contact angle measurement by a capillary rise height method by use of the Washburn equation and the evaluation method according to Owens, Wendt, Rabel and Kaelble, is not more than 35 mN/m,
   wherein the polyamide powder absorbs liquid in a volume of 1.000 pl/g to 30,000 pl/g, wherein the polyamide powder contains only a single type of polyamide, and
   wherein the powder has open mesopores and the cumulative pore volume distribution of the mesopores, measured to DIN 66134, is at least 0.01 cm$^3$/g.

4. The polyamide powder according to claim 1, wherein a weight-average particle diameter $d_{50}$ of the polyamide powder, measured by laser diffraction, is not more than 100 μm.

5. The polyamide powder according to claim 1, wherein a weight-average particle diameter $d_{50}$ of the polyamide powder, measured by laser diffraction, is from 10 μm to 80 μm.

6. A polyamide powder for selective absorbing sintering, SAS, or selective inhibition sintering SIS,
   wherein the polyamide has a solution viscosity to ISO 307 of 1.8 to 2 and a rise in the solution viscosity of 5% to 25%, when subjected to a temperature 20° C. below its melting temperature under air for 20 hours,
   an excess of carboxylic acid end groups over amine end groups of 20 to 60 mmol/kg,
   a surface energy of the polyamide, determined by a contact angle measurement by a capillary rise height method by use of the Washburn equation and the evaluation method according to Owens, Wendt, Rabel and Kaelble, is not more than 35 mN/m,
   wherein the polyamide powder absorbs liquid in a volume of 1,000 pl/g to 30,000 pl/g, wherein the polyamide powder contains only a single type of polyamide, and
   wherein a bulk density of the polyamide powder, measured to DIN 53466, is between 300 g/l and 600 g/l.

7. The polyamide powder according to claim 1, wherein a surface energy of the polyamide, determined by a contact angle measurement by a capillary rise height method by use of the Washburn equation and the evaluation method according to Owens, Wendt, Rabel and Kaelble, is from 25 mN/m to 32 mN/m.

8. The polyamide powder according to claim 1, wherein the polyamide powder is obtained by a precipitation process.

9. A process for producing the polyamide powder according to claim 1, comprising:
   (a) polymerizing and/or polycondensing monomers to give a polyamide; and
   (b) producing a powder by grinding or precipitation,
   wherein dicarboxylic acids are added as a chain transfer agent in (a) to achieve a carboxylic acid end group excess.

10. The process according to claim 9, wherein the dicarboxylic acids are added in such a ratio as to achieve an excess of 20 to 60 mmol/kg, based on a mass of the polyamide powder.

11. Shaped bodies which are obtained at least partly from the polyamide powder according to claim 1.

12. A process for producing shaped bodies, comprising using the polyamide powder according to claim 1 in a SAS method or a SIS method.

13. The polyamide powder according to claim 8, wherein a suspension obtained by precipitation is left at a temperature of 2-4 K above the precipitation temperature for 10 to 180 min, after precipitation.

14. The polyamide powder according to claim 1, wherein a BET surface area of the polyamide powder, measured to DIN ISO 9277, is from 10 m$^2$/g to 30 m$^2$/g.

15. The polyamide powder according to claim 1, wherein the single type of polyamide is nylon-12.

16. The polyamide powder according to claim 1, wherein the single type of polyamide is an AB type polyamide.

17. The polyamide powder according to claim 1, wherein the single type of polyamide is an AABB type polyamide.

18. The polyamide powder according to claim 1, wherein the polyamide powder consists essentially of the single type of polyamide.

19. The polyamide powder according to claim 15, wherein the polyamide powder consists essentially of nylon-12.

20. The polyamide powder according to claim 15, wherein the polyamide of the polyamide polymer consists of nylon-12.

* * * * *